(No Model.)
G. W. BENNUM.
INFLATION VALVE.
No. 547,512. Patented Oct. 8, 1895.
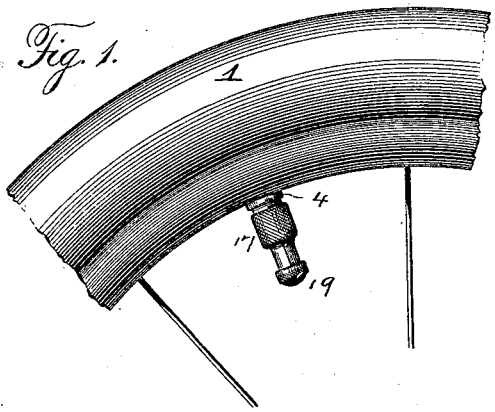
Fig. 1.
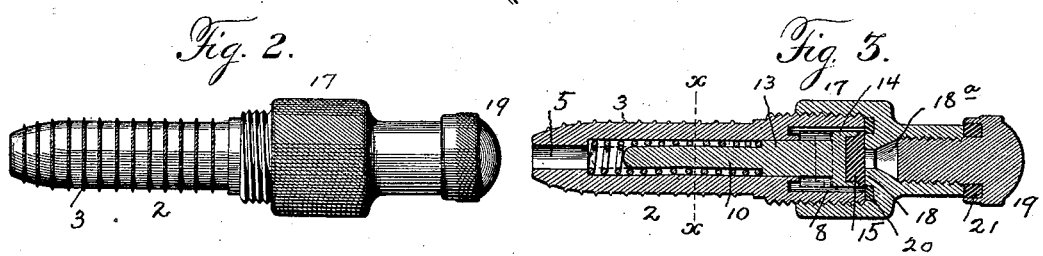
Fig. 2. Fig. 3.
Fig. 4.
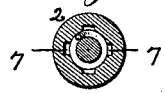
Fig. 5.
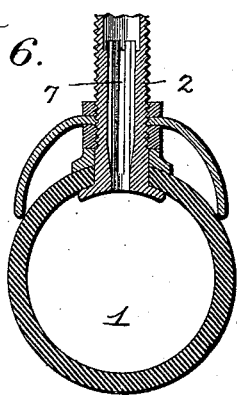
Fig. 6.
Witnesses:
John Enders Jr.
Henry O. Bennum
Inventor:
George W. Bennum,
by George W. Bennum,
Attorney.

UNITED STATES PATENT OFFICE.

GEORGE W. BENNUM, OF GEORGETOWN, DELAWARE, ASSIGNOR OF ONE-HALF TO WILLIAM J. THOROUGHGOOD, OF SAME PLACE.

INFLATION-VALVE.

SPECIFICATION forming part of Letters Patent No. 547,512, dated October 8, 1895.

Application filed March 9, 1895. Serial No. 541,177. (No model.)

*To all whom it may concern:*

Be it known that I, GEORGE W. BENNUM, a citizen of the United States, residing at Georgetown, in the county of Sussex and State of Delaware, have invented certain new and useful Improvements in Inflation-Valves; and I do hereby declare the following to be a full, clear, and exact description of the invention, such as will enable others skilled in the art to which it appertains to make and the same.

My invention relates to improvements in valves for inflating the pneumatic tires of bicycle and other wheels, and its object is to provide a device of this character which shall possess important advantages with respect to efficiency in operation.

The invention consists in the novel construction and combination of parts hereinafter fully described and claimed.

In the accompanying drawings, Figure 1 is an elevation showing a portion of a bicycle-wheel with my improved valve applied thereto. Fig. 2 is an elevation of the valve detached, on an enlarged scale. Fig. 3 is a longitudinal sectional view. Fig. 4 is a view, partly in section and partly in elevation, showing the parts comprising the same disconnected or detached from each other. Fig. 5 is a cross-section on the line $x\,x$, Fig. 3. Fig. 6 is sectional view showing a modification in the manner of connecting the valve with the tire.

In the said drawings the reference-numeral 1 designates the pneumatic tire secured to the semicircular rim of the wheel in any ordinary or suitable manner.

The numeral 2 designates the shank of the valve, consisting of a tapering cylindrical metal tube having a number of peripheral projections or ribs 3, which engage with the nipple 4 on the tire, and by which the shank is held in place. This tube is provided at its inner end with a cylindrical bore 5, which communicates with an enlarged cylindrical recess 6, formed with a number of longitudinal grooves 7, which form air-passages. At its outer end the tube is formed with a cylindrical recess 8, forming an annular chamber to receive a cup-shaped head. Located in this tube is a stem 10, comprising the cylindrical portion 13 and cylindrical head 14, which latter is cup-shaped or formed with an annular recess to receive a washer 15, which constitutes a valve. A coiled spring 16 surrounds the rod 10, the tendency of which is to force the rod and its head and valve outward.

The numeral 17 designates a cap, screw-threaded interiorly to engage with corresponding heads on the exterior of the shank. This cap is provided with an annular flange 18, which forms a seat for the valve 15, and is also formed with an opening $18^a$ and a screw-threaded recess to receive a screw-plug 19.

The numerals 20 and 21 designate washers for making air-tight joints.

The manner of using the device is as follows: The screw-plug is removed and the cap is connected with an air-pump. Air is then forced through the opening in the cap, forcing the valve away from its seat and escaping through the grooves in the shank into the tire. When the pressure in the valve is relieved, the back-pressure, aided by the coiled spring, will force the valve against its seat, preventing the escape of the air therefrom.

In the modification shown in Fig. 6 the peripheral ribs or projections on the shank are dispensed with and the inner end of the shank formed with a flange, which is connected with the tire by a nut and washer.

A valve constructed as above described will be very efficient in operation, as it works automatically and effectually prevents the escape of air, and it possesses advantages which will be apparent to those skilled in the art to which the invention pertains.

Having thus fully described my invention, what I claim is—

1. In an inflation valve, the combination with the shank having a cylindrical opening at its inner end, an enlarged recess formed with a groove or grooves, and the cylindrical recess at the outer end, the valve comprising the cup shaped head seated in said recess, the washer, and the stem secured to said head and pointing toward the outlet of the shank, of the screw cap engaging with said shank, provided with an annular valve seat and the washer surrounding said valve seat, substantially as described.

2. In an inflation valve, the combination with the shank having a cylindrical opening at its inner end, an enlarged recess formed with a groove or grooves and a cylindrical recess at the outer end, the stem located in said
5 recess and pointing toward the tire, the cup shaped head, the valve located therein, and the coiled spring, of the screw cap engaging with said shank, provided with an annular valve seat, the washer surrounding said valve seat, and the screw plug in the outer end of 10 the cap, substantially as described.

In testimony whereof I affix my signature in presence of two witnesses.

GEORGE W. BENNUM.

Witnesses:
  HENRY O. BENNUM,
  GEORGE M. SPAULDING.